Nov. 29, 1949     S. E. HAND     2,489,637
SPLIT-PHASE INDUCTION MOTOR CONTROL
Filed June 28, 1946
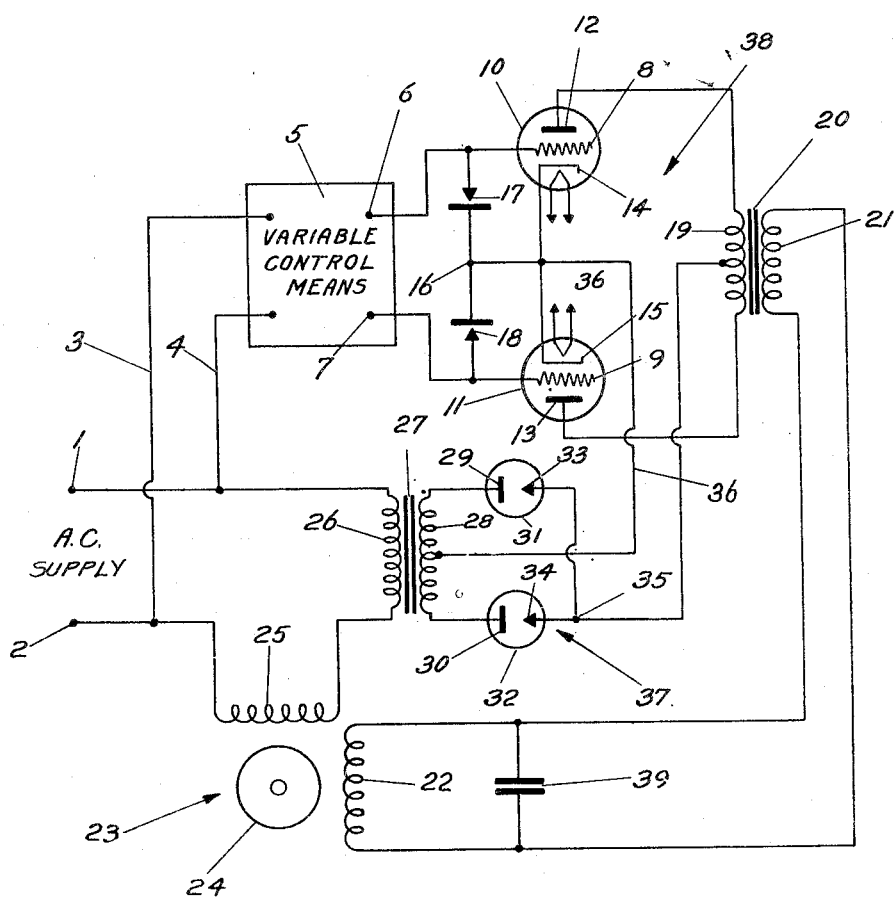
INVENTOR
STANLEY ELLIS HAND Patented Nov. 29, 1949

2,489,637

UNITED STATES PATENT OFFICE 2,489,637

SPLIT-PHASE INDUCTION MOTOR CONTROL

Stanley Ellis Hand, Waltham, Mass., assignor, by mesne assignments, to Raytheon Manufacturing Company, Newton, Mass., a corporation of Delaware Application June 28, 1946, Serial No. 679,925

7 Claims. (Cl. 318—227)

This invention relates to electrical circuits, and more particularly to a motor control circuit.

An object of this invention is to reduce or eliminate the standstill heating of a two-phase motor.

Another object is to devise a circuit whereby the voltage on both phases of a two-phase motor may be controlled.

A further object is to devise a relatively simple system for accomplishing the above objects in an efficient manner.

The foregoing and other objects of the invention will be best understood from the following description of an exemplification thereof, reference being had to the accompanying drawing, wherein the single figure is a diagrammatic representation of one system wherein the invention may be embodied.

Referring to the drawing, input terminals 1 and 2 of the system are connected to an alternating current supply of any suitable character. Leads 3 and 4 connect the input side of a variable control means 5 to the terminals 1 and 2, and therefore also to the A. C. supply. Control means 5 may be any desired means, responsive to a condition, which receives an alternating voltage at its input side and provides at its output terminals 6 and 7 an alternating voltage which is variable in amplitude and of the same frequency as the voltage of the A. C. supply, but either in phase or 180° out of phase with said supply voltage.

Output terminals 6 and 7 are connected, respectively, to grids 8 and 9 of a pair of electron-discharge tubes 10 and 11 which also include, respectively, anodes 12 and 13 and cathodes 14 and 15. Cathodes 14 and 15 are connected to each other and to the common anode terminal 16 of a pair of half-wave rectifiers 17 and 18 which are connected back-to-back between grids 8 and 9, with the cathode of each rectifier connected to its corresponding grid. For a more complete description of the rectifiers 17 and 18 and their operation, reference should be made to my copending application, Ser. No. 679,923, filed June 28, 1946, now abandoned. Anodes 12 and 13 are connected to opposite ends of the primary 19 of an output transformer 20, across the secondary 21 of which is connected one phase winding 22 of a two-phase motor 23, the rotor of which is indicated schematically at 24.

The other phase winding 25 of motor 23 is connected in series in the lead between the A. C. supply and the primary winding 26 of the power supply transformer 27. Opposite ends of secondary 28 of transformer 27 are connected to the respective anodes 29 and 30 of a pair of half-wave rectifiers 31 and 32, cathodes 33 and 34 of which are connected together at point 35, which point is connected directly to the midpoint of output transformer winding 19. A lead 36 connects the midpoint of transformer winding 28 to cathodes 14 and 15. It will be noted that the output of power or plate supply 37 is unfiltered, in accordance with the principles disclosed in my copending application, Serial No. 679,924, filed June 28, 1946.

Amplifier 38 is operated as a class B or class C amplifier, so that the quiescent current drawn by the tubes 10 and 11 is small or is zero with zero grid signal applied to them from control means 5. When there is zero grid signal, there is no voltage across the "control" phase 22 of motor 23, so that said motor 23 is at standstill. Since with zero grid signal there is little or no plate current drawn by tubes 10 and 11, at this time no current or only a small current is drawn by power supply 37 from the source, so that the "fixed" phase 25 of the motor 23 has little or no voltage across it. By reducing or eliminating the "fixed" phase voltage of the motor at standstill (that is, when there is no voltage across the "control" phase 22) in this manner, standstill heating of the motor is reduced or eliminated, because the current flowing in phase 25 is, of course, also reduced or eliminated.

If a grid signal is applied to tubes 10 and 11 from control means 5, a voltage, in phase with the signal, appears across transformer winding 21 and is applied to "control" phase 22 of the motor. As the plate current drawn by tubes 10 and 11 increases in response to this grid signal, an increased current is drawn by the amplifier power supply 37 from the source, increasing the current through phase 25 and also the voltage across this phase. It is therefore apparent that the voltage on both phases 22 and 25 of the motor is controlled at the same time.

As explained above, the voltage appearing across output terminals 6 and 7 of means 5 is either in phase or 180° out of phase with the supply voltage. In order to give the necessary 90° phase difference between the voltages in the two phases 22 and 25, which phase difference is necessary for two-phase motor operation, a capacitor 39 is connected across phase 22 of the motor. The motor will rotate in one direction or the other when a grid signal is applied to the tubes of amplifier 38, depending on the relative phase of the signal with respect to the supply voltage, because of the appearance of a voltage across phase 22 in response to said grid signal.

The voltage across phase 25 is also increased or established at this time, in the manner described above, in order to produce a torque or to increase the torque.

The varying load supplied by power supply 37 to amplifier 38, in response to the changing plate current of tubes 10 and 11, acts as only a varying resistance load on the primary 26 of transformer 27. Therefore, the phase of the voltage across phase 25 of the motor does not change, and the phase of this voltage is unaffected by the phasing of the grid signal or grid drive voltage which is supplied to amplifier 38 from means 5. The amplifier 38 may be thought of as a variable impedance means in series between power supply 37 and phase winding 22, because the impedance of the tubes is varied by the grid signal, causing varying amounts of current to be drawn from supply 37.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A motor control circuit, comprising a two-phase motor having two separate phase windings, a controlled electron-discharge tube power amplifier, said amplifier being so biased that the quiescent plate current drawn by said amplifier is substantially zero, a rectifier power supply for said amplifier terminal means whereby said power supply may be connected to be energized from a source of alternating current, said power supply having its output connected to supply power to said amplifier, means connecting one of said phase windings in series between said terminal means and said power supply, and means connecting the output of said amplifier to the other phase winding.

2. A motor control circuit, comprising a two-phase motor having two separate phase windings, a controlled electron-discharge tube power amplifier, said amplifier being so biased that the quiescent plate current drawn by said amplifier is substantially zero, terminal means whereby said circuit may be connected to a source of alternating current, means connecting the input of said amplifier to said terminal means, a rectifier power supply for said amplifier connected to be energized from said terminal means and having its output connected to supply power to said amplifier, means connecting one of said phase windings in series between said terminal means and said power supply, and means connecting the output of said amplifier to the other phase winding.

3. A motor control circuit, comprising a two-phase motor having two separate phase windings, a controlled electron-discharge tube power amplifier, said amplifier being so biased that the quiescent plate current drawn by said amplifier is substantially zero, terminal means whereby said circuit may be connected to a source of alternating current, variable control means connecting the input of said amplifier to said terminal means, a rectifier power supply for said amplifier connected to be energized from said terminal means and having its output connected to supply power to said amplifier, means connecting one of said phase windings in series between said terminal means and said power supply, and means connecting the output of said amplifier to the other phase winding.

4. A motor control circuit, comprising a polyphase motor having a plurality of phase windings, a variable impedance means of a kind which is adapted to be energized with unidirectional current, a rectifier power supply, terminal means whereby said supply may be connected to be energized from a source of alternating current, one of said phase windings being connected in series between said terminal means and said power supply, said variable impedance means being effectively connected in series between the output of said power supply and another of said phase windings.

5. A motor control circuit, comprising a polyphase motor having a plurality of phase windings, a controlled power amplifier, a rectifier power supply for said amplifier, terminal means whereby said power supply may be connected to be energized from a source of alternating current, said power supply having its output connected to said amplifier, one of said phase windings being connected in series between said terminal means and said power supply, and means connecting the output of said amplifier to another of said phase windings.

6. A motor control circuit, comprising a two-phase motor having two separate phase windings, a controlled power amplifier, a rectifier power supply for said amplifier, terminal means whereby said power supply may be connected to be energized from a source of alternating current, said power supply having its output connected to said amplifier, one of said phase windings being connected in series between said terminal means and said power supply, and means connecting the output of said amplifier to the other phase winding.

7. A motor control circuit, comprising a polyphase motor having a plurality of phase windings, terminal means whereby said circuit may be connected to a source of alternating current, a rectifier power supply, means connecting said power supply to said terminal means for energization with alternating current, a control-signal relay of a kind which is adapted to be energized with unidirectional current, means connecting the output of said power supply to said relay, one of said phase windings being connected in series between said terminal means and said power supply, and means connecting the output of said relay to another of said phase windings.

STANLEY ELLIS HAND.

REFERENCES CITED

The following references are of record in the file of this patent:

UNITED STATES PATENTS

| Number | Name | Date |
|---|---|---|
| 505,859 | Stanley et al. | Oct. 3, 1893 |
| 1,050,444 | Fynn | Jan. 14, 1913 |
| 1,586,233 | Anschulz-Kaempfe | May 25, 1926 |
| 2,260,122 | Moore | Oct. 21, 1941 |
| 2,303,654 | Newton | Dec. 1, 1942 |
| 2,411,608 | Lesnick | Nov. 26, 1946 |